United States Patent
Seitel et al.

(10) Patent No.: US 11,529,832 B2
(45) Date of Patent: Dec. 20, 2022

(54) DEVICE AND METHOD FOR DETERMINING SINGLE OR TWIN TIRES MOUNTED ON EACH SIDE OF A VEHICLE AXLE

(71) Applicant: SICK AG, Waldkirch (DE)

(72) Inventors: Thomas Seitel, Waldkirch (DE); Andreas Tarnoki, Waldkirch (DE)

(73) Assignee: SICK AG, Waldkirch (DE)

( * ) Notice: Subject to any disclaimer, the term of this patent is extended or adjusted under 35 U.S.C. 154(b) by 794 days.

(21) Appl. No.: 16/509,996

(22) Filed: Jul. 12, 2019

(65) Prior Publication Data

US 2020/0047570 A1    Feb. 13, 2020

(30) Foreign Application Priority Data

Aug. 13, 2018   (EP) ..................................... 18188693

(51) Int. Cl.
| | |
|---|---|
| *B60C 25/05* | (2006.01) |
| *B60B 11/02* | (2006.01) |
| *G01M 17/02* | (2006.01) |
| *B60C 5/22* | (2006.01) |
| *G06V 10/10* | (2022.01) |

(52) U.S. Cl.
CPC .......... *B60C 25/0554* (2013.01); *B60B 11/02* (2013.01); *B60C 5/22* (2013.01); *G01M 17/027* (2013.01); *G06V 10/10* (2022.01); *B60C 2200/06* (2013.01)

(58) Field of Classification Search
CPC . B60C 25/0554; G01M 17/027; G06V 10/10; G06V 20/54
See application file for complete search history.

(56) References Cited

U.S. PATENT DOCUMENTS

2012/0020526 A1* 1/2012 Teti ....................... G06T 7/0004
382/104

FOREIGN PATENT DOCUMENTS

| DE | 4201523 A1 | 7/1993 |
|---|---|---|
| DE | 102006042309 A1 | 3/2008 |
| DE | 102010002258 A1 | 8/2011 |
| EP | 3193276 A1 | 7/2017 |

OTHER PUBLICATIONS

European Search Report dated Nov. 26, 2018, for corresponding priority application EP 18188693.8.
Questions from print out from German Website and Web Blog, www.gutefrage.net/grage/warum-ragen-bei . . . dated Dec. 31, 2016; with English translation questions at the end of the document, retrieved Nov. 2, 2018.

* cited by examiner

*Primary Examiner* — Eric S. McCall
*Assistant Examiner* — Timothy P Graves
(74) *Attorney, Agent, or Firm* — Nath, Goldberg & Meyer; Jerald L. Meyer; Morgan D. Rosenberg

(57) ABSTRACT

The invention concerns a device and a method for detecting a tire on a vehicle to determine whether there is a single or twin tire on an axle. The device has an optical sensor for this purpose, the sensor detecting at least one region of a rim on which a tire to be determined is mounted. An evaluation unit is also provided which is designed to determine a shape of the area of the rim from the sensor signals and to generate a signal from the shape which represents the type of tire.

10 Claims, 4 Drawing Sheets

Figure 1:
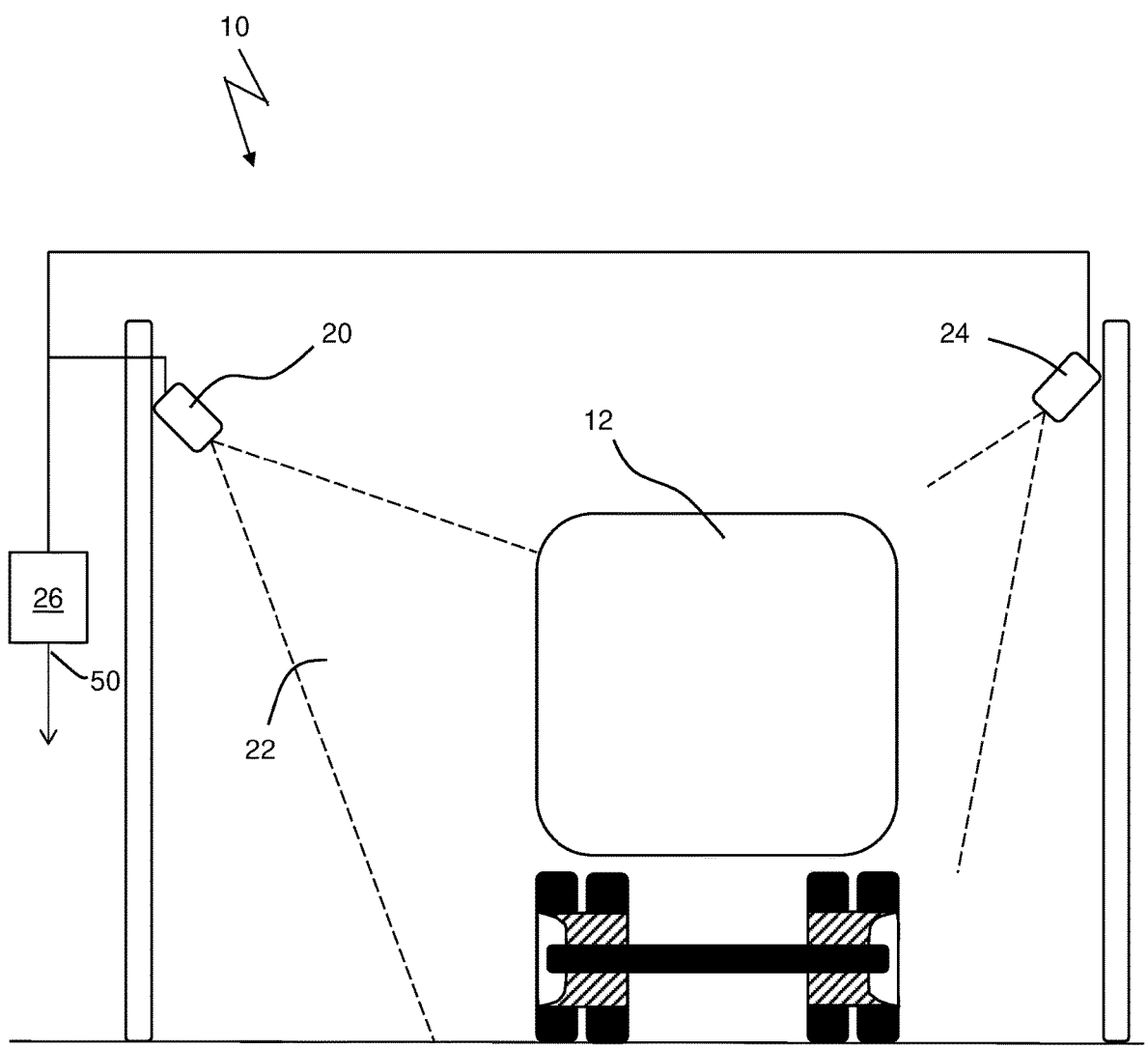

DEVICE AND METHOD FOR DETERMINING SINGLE OR TWIN TIRES MOUNTED ON EACH SIDE OF A VEHICLE AXLE

The invention concerns a device and a method for detecting a tire on a vehicle to determine whether there is a single or twin tire on an axle, using an optical sensor.

Information on the tires of a vehicle is particularly desirable in electronic tolling systems, since the number of axles and the type of tires used have a direct influence on the permissible total weight of the vehicle and thus on the toll. Various systems are available for recording the vehicle and its axles, which detect the vehicle and its axles via induction loops, piezo sensors or optically via laser scanner or camera.

Furthermore, it is also important for such tolling systems whether there are single or twin tires. There is currently no product or system on the market that can visually detect a twin tire. A generic device is known from DE 42 01 523 A1, in which the running surface of a tire is recorded with a camera according to the light section method and a height profile and thus the type of tire is determined via the distortion of the light line.

However, such a detection of the running surface is very difficult to achieve in flowing traffic, since, for example, only little space is available for a clear view of the running surface and, in the case of multi-lane roads, shading from other vehicles is to be expected.

Based on this state of the art it is the object of the invention to provide an improved device with which a tire can be reliably detected.

According to the device, the task is solved by a device for detecting a tire of a vehicle for determining whether single or twin tires are present on an axle, having an optical sensor, whereby the sensor detects at least one region of a rim, on which a tire to be determined is mounted, and an evaluation unit is provided which is designed to determine a shape of the region of the rim from the sensor signals and, as a function of the determined shape, generates a signal which represents the type of tire.

In accordance with the invention, the device for detecting a tire of a vehicle for determining whether single or twin tires are present on an axle comprises an optical sensor, the sensor detecting at least one region of a rim, on which a tire to be determined is mounted, and furthermore an evaluation unit being provided, which is designed to determine a shape of the region of the rim from the sensor signals and generates a signal which represents the type of tire as a function of the shape.

The invention is thus based on the essential knowledge that tires and rim shape correlate and that the rim shape, or better the shape of an area of the rim, can then simply be determined from the outside by means of an optical sensor and that the recognised shape can then be used to draw conclusions about the tires, i.e. whether single or twin tires are present.

This results in the essential advantages that no separate sensors (such as loops or piezo) have to be installed in the road surface to detect the tires, and a clear view of the sensor onto the rim without shadowing is much easier to achieve than a view of the running surface of the tires.

With particular advantage, even existing laser scanners can be used for the invention in well-known vehicle classification systems, such as those used today in toll systems. It must only be ensured that the laser scanner has a view of the rims. In this way, the laser scanner fulfils two functions, namely vehicle recognition (profile detection) on the one hand and the inventive tire recognition via rim detection on the other.

In addition, it is advantageous if a scanning plane of the laser scanner is not aligned horizontally but rather vertically.

In further training of the invention, the evaluation unit can also take over both functions, i.e. in addition to the recognition of tires according to the invention, a vehicle classification can also be carried out.

The evaluation unit could also be designed to determine a number of axles for a vehicle.

In an inventive alternative, the sensor can be designed as a 2D or 3D camera. In the case of a 2D camera, the rim shape is determined from the two-dimensional image via intelligent image evaluation. Nowadays such an evaluation can be solved very well with the so-called Deep Learning approach. A more direct determination of the rim shape can be possible with a 3D camera, from whose distance data the rim shape can possibly be recognized immediately. It goes without saying that the camera must be able to see the rim without shadowing.

In accordance with the method, the task is solved by a procedure for detecting a tire of a vehicle to determine whether there is a single or twin tire on an axle with the steps:

providing an optical sensor, detecting with the sensor at least one region of a rim, on which a tire to be determined is mounted, and generating corresponding sensor data, determining a shape of the at least one region of the rim from the sensor data, determining of the tires from the shape of the area of the rim, outputting of a signal to indicate whether single or twin tires are fitted.

Usually, single tires are used when the rim curves outwards in certain areas and twin tires are used when the wheel hub curves inwards in certain areas, so that advantageously only the rough shape of the rim or only the shape of the rim in certain radial areas must be detected in order to be able to output a signal corresponding to the tire.

In the following, the invention will be explained in detail with reference to the drawing and an embodiment shown in the drawing.

Figure 2:
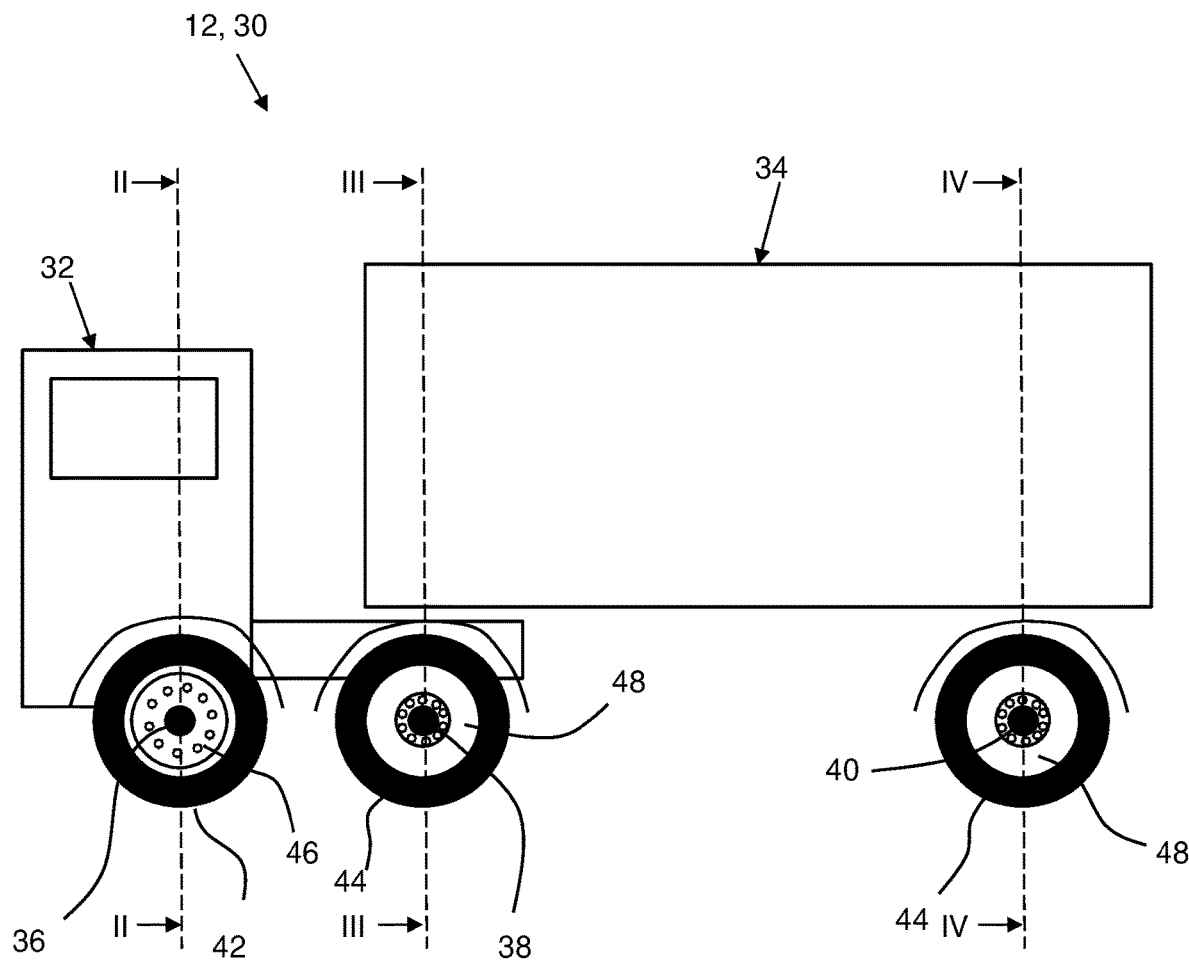
Figure 3:
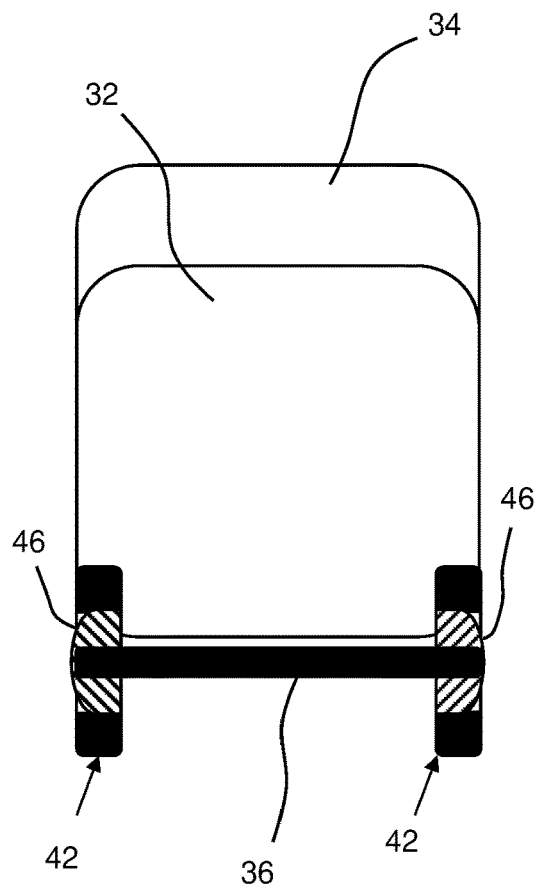
Figure 4:
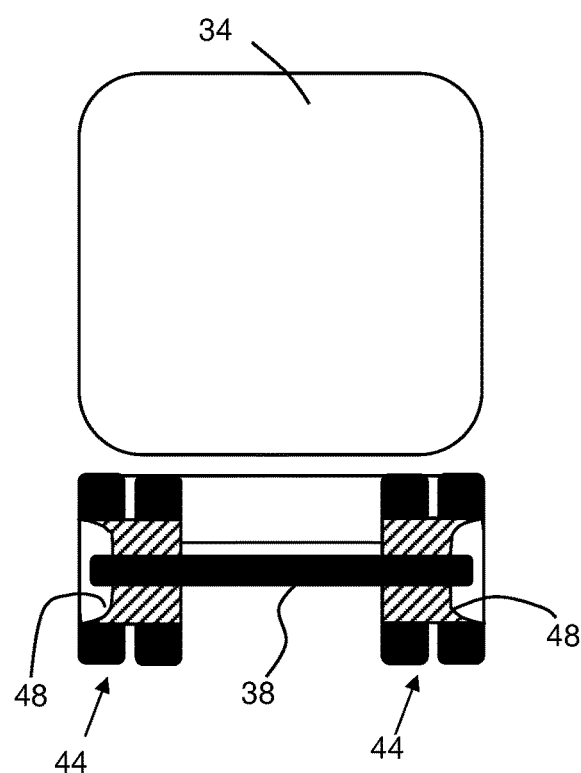
Figure 5:
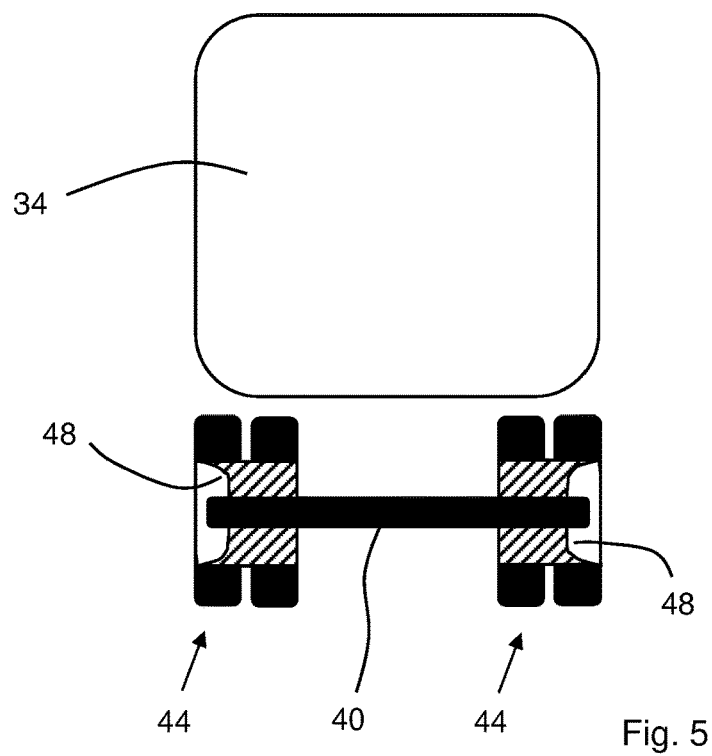
Figure 6:
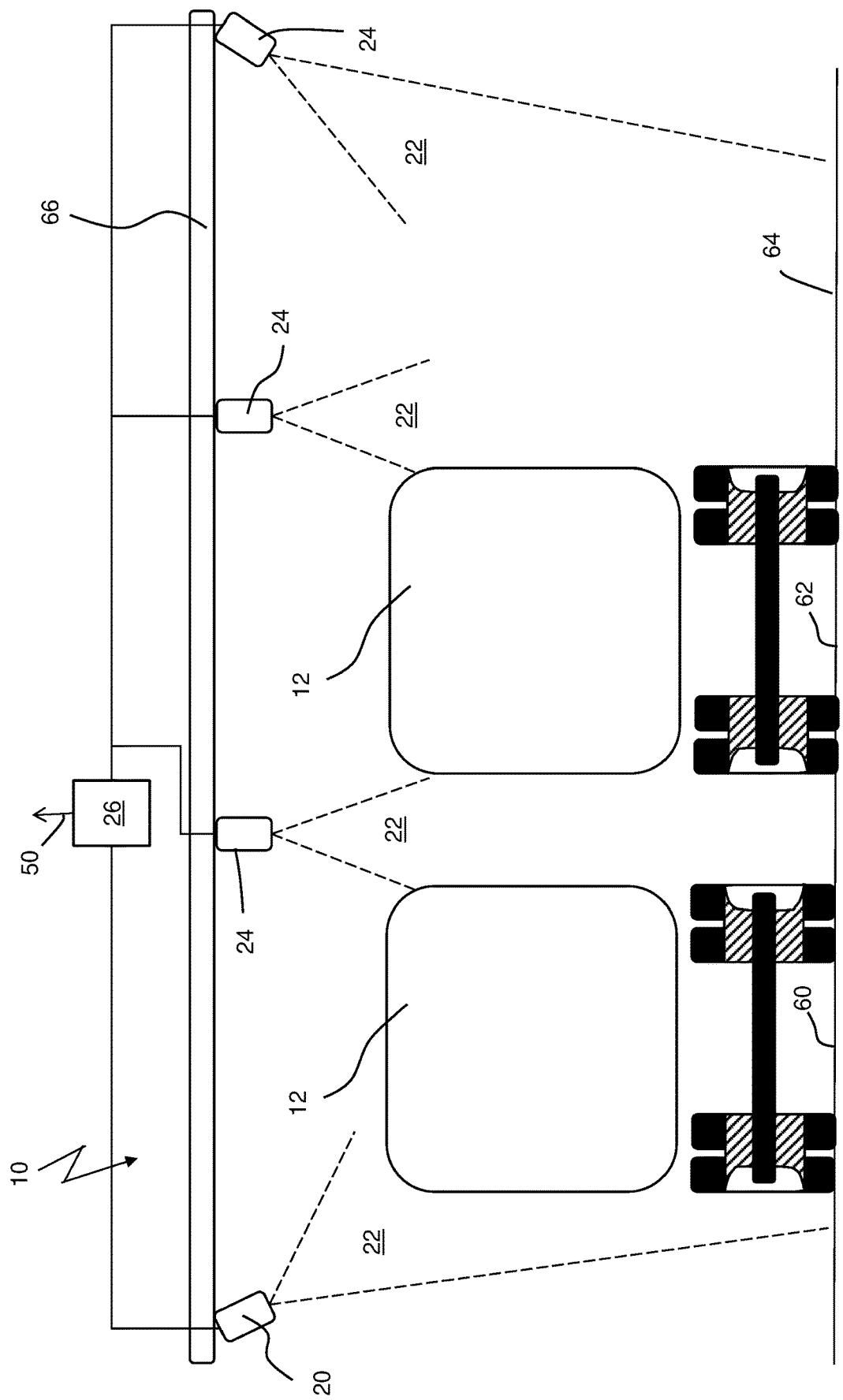

FIG. 1 an inventive device with a vehicle;

FIG. 2 a schematic side view of a vehicle with three axles and single and twin tires;

FIGS. 3 to 5 schematic cross-sectional views at the height of the axles of the vehicle from FIG. 2;

FIG. 6 an embodiment of the inventive device with two vehicles.

A device 10 in accordance with the invention for detecting a tire of a vehicle 12 for determining whether a single or twin tire is fitted to an axle comprises an optical sensor 20. The sensor 20 can be designed as a laser scanner or preferably as a camera. In the case of the sensor 20 being a laser scanner, the sensor 20 is mounted at the side of a roadway in such a way that its scanning plane 22 is essentially vertical and thus optically detects a passing vehicle 12 at least laterally. The laser scanner 20 cyclically records distance profiles so that a profile of the vehicle can be created by assembling the individual scans while driving past. In the case of the sensor 20 being camera, the sensor 20 takes images of the vehicle 12 in its field of view 22. As a rule, an image recording is triggered by another sensor that is not displayed and detects the presence of the vehicle 12. Combinations of laser scanners and cameras are also conceivable, since at measuring stations, as shown in FIGS. 1 and 6, different tasks have to be performed. These tasks include vehicle classification, license plate recognition, axle counting and the like.

In the embodiment according to FIG. 1, vehicle 12 is also detected from the other side with another sensor 24, so that a complete profile of the vehicle can be created for vehicle classification. The detection from two sides is also important for multi-lane road (see FIG. 6), because with more lanes often vehicles 12 drive side by side and in side view one vehicle can cover the other. In multi-lane lanes it is therefore most sensible to arrange the sensors 20, 24 above the road and above the vehicles so that vehicles on each lane can be detected from both sides as far as possible, as indicated in FIG. 6, in which a road with three lanes 60, 62 and 64 is shown. The sensors 20, 24 are mounted there on a cross member 66 in such a way that their respective field of view 22 can detect the vehicle 12 on a lane from the side. Mounting position 24 does not necessarily have to be in the middle between the lanes, as illustrated in FIG. 6. The sensors 24 between the lanes 60, 62 and 64 from FIG. 6 do not necessarily have to be assigned to two lanes at the same time. Two sensors can also be provided per lane, for each side of the vehicle. This is all a question of the most suitable topology and depends on several parameters, e.g. the height of the crossmember, the width of the lanes and thus the distance between neighbouring vehicles.

Furthermore, the inventive device 10 has an evaluation unit 26 which processes the sensor data supplied by the sensor 20 or by the sensors 20 and 24 in order to fulfil the aforementioned tasks.

The core of the invention, namely the tire recognition, is to be explained on the basis of the vehicle 12 shown in FIG. 2 in the side view and FIGS. 3 to 5 in cross-section. The vehicle 12 shown is a truck 30 with tractor unit 32 and trailer 34. The tractor unit 32 has two axles 36 and 38 and the trailer one axle 40. The wheels 42 on the first axle 36 have single tires, which should be shown in the cross-sectional view of FIG. 3. The wheels 44 on the second axle 38 and third axle 40 each have twin tires, which should be shown in the cross-sectional illustrations of FIGS. 4 and 5. Depending on the tires, the rim of a wheel has a characteristic shape. The rims 46 of the wheels 42 of the first axle are at least partly curved outwards (FIG. 3) and the rims 48 of the wheels 44 of the other two axles 38 and 40 are curved inwards (FIGS. 4 and 5). These are the typical characteristics for single and twin tires.

In the field of view 22 of the sensor 20 or 24 at a certain point in time at least this mentioned curved area of a rim is located. If the sensor 20 is designed as a laser scanner or 3D camera, it records a distance profile of the passing trucks 12, i.e. it transmits its sensor data to the evaluation unit 26, in which the lateral profile including the shape of the rims 46 and 48 is created from the individual distance profiles. From the shape of the rims 46 and 48, the evaluation unit 26 can deduce the type of tires, for example by comparison with known shapes. If the tires are determined in this way, a signal is generated representing the type of tires and provided at an output 50.

If the sensor 20 is designed as a 2D camera, the sensor takes a picture of the vehicle 12. By suitable image processing, for example using deep learning methods, the image can then be evaluated with regard to the shape of the rim and therewith the tires. In this respect, the chosen formulation in claim 1 means that a shape of the rim area 46, 48 is determined from the sensor signals and that, depending on the shape determined, a signal representing the type of tire is generated, which also means such an image evaluation with Deep Learning.

If the number of rim shapes is limited, the shapes could, for example, be stored in a memory in the evaluation unit as references, so that by comparing the measured rim shape with the references, the exact rim can be determined and the tires determined. However, this is only possible if the rim can be measured sufficiently, which is only possible with a sufficient view of the rim. As described above, in principle it is sufficient to know whether the rim is curved inwards or outwards in defined areas.

By determining the complete vehicle profile, it is possible that a vehicle classification can also be carried out with the evaluation unit 26 using the inventive device 10. Of course, the number of axles for a vehicle can also be determined in the same way.

The invention claimed is:

1. A device for detecting a tire of a vehicle (12) for determining whether single or twin tires are present on each end of an axle (36, 38, 40), comprising:
   an optical sensor (20, 24), wherein the optical sensor (20, 24) detects at least one region of a rim (46, 48) on which the tire is mounted, the optical sensor (20, 24) generating a sensor signal based on said detection; and
   an evaluation unit (26) configured to determine a shape of the at least one region of the rim (46, 48) from the sensor signal generated by the optical sensor (20, 24) and, as a function of the determined shape, generates an evaluation unit signal which represents whether single or twin tires are mounted on each of the ends of the axle (36, 38, 40).

2. The device according to claim 1, characterized in that the optical sensor is designed as a distance-measuring laser scanner.

3. The device according to claim 2, characterized in that a scanning plane of the laser scanner is not horizontally aligned.

4. The device according to claim 1, characterized in that the optical sensor detects not only the rim but also the vehicle.

5. The device according to claim 1, characterized in that the evaluation unit is further configured to carry out a vehicle classification.

6. The device according to claim 1, characterized in that the evaluation unit is adapted to determine a number of axles of the vehicle.

7. The device according to claim 1, characterized in that the optical sensor is designed as a 2D or 3D camera.

8. A method for detecting a tire of a vehicle for determining whether single or twin tires are mounted on each end of an axle, comprising the steps:
   providing an optical sensor;
   detecting with the optical sensor at least one region of a rim on which a tire is mounted, and generating corresponding sensor data;
   determining a shape of the at least one region of the rim from the sensor data;
   determining whether single or twin tires are mounted on each of the ends of the axle from the shape of the at least one region of the rim; and
   outputting a signal to indicate whether single or twin tires are mounted on each of the ends of the axle.

9. The method according to claim 8, characterized in that the signal to indicate the single tire is output in the case of the shape of the at least one region of the rim being curved outwards, and the signal to indicate the twin tires is output in the case of the shape of the at least one region of the rim being curved inwards.

10. The method according to claim 8, characterized in that the determination of the tire from the shape of the at least one region of the rim is carried out by comparison with stored reference rim shapes.

\* \* \* \* \*